Nov. 24, 1959
R. J. HENGSTEBECK
2,914,465
PLATINUM CATALYST REFORMING PROCESS
Filed July 16, 1957
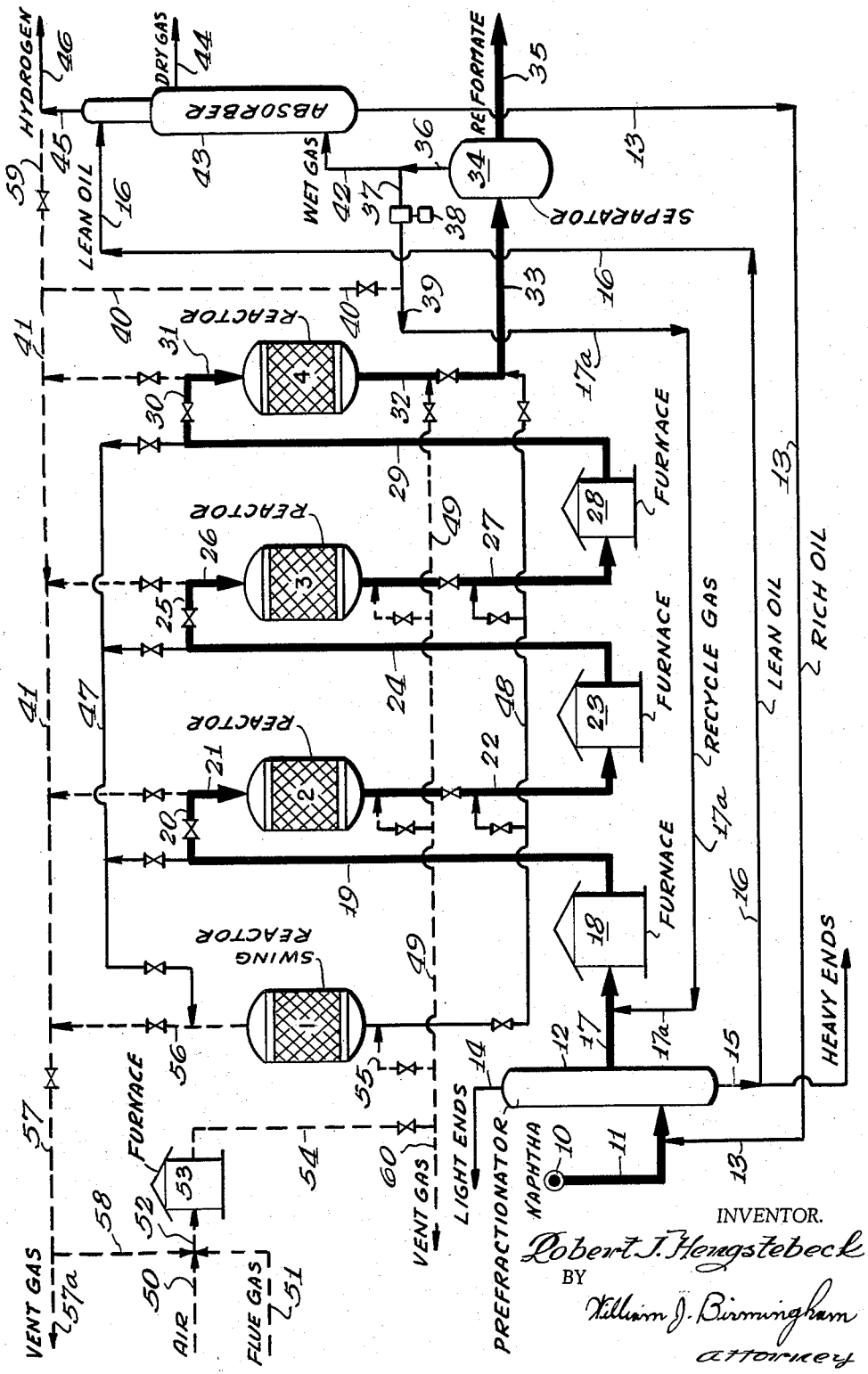
INVENTOR.
*Robert J. Hengstebeck*
BY
*William J. Birmingham*
*Attorney*

United States Patent Office 2,914,465
Patented Nov. 24, 1959

2,914,465

PLATINUM CATALYST REFORMING PROCESS

Robert J. Hengstebeck, Valparaiso, Ind., assignor to Standard Oil Company, Chicago, Ill., a corporation of Indiana Application July 16, 1957, Serial No. 672,164

9 Claims. (Cl. 208—140)

This invention relates to a method of operating a platinum catalyst naphtha reforming system, and it pertains more particularly to a method for avoiding the formation of heat-fronts in the catalyst bed of a reactor which is being brought on-stream at reforming temperatures.

Platinum catalyst hydroforming systems present problems very different from those encountered in molybdenum systems. One particularly difficult problem has been the unexpected formation of heat-fronts or hot-spots which pass through a catalyst bed when new or freshly-regenerated platinum catalyst initially comes in contact with both hydrogen and hydrocarbons at reforming temperatures, e.g., 800° F. to 1050° F. This situation arises, for instance, when returning a bed of regenerated platinum catalyst to a high-octane, on-stream operation in a multiple fixed-bed system, as exemplified by Ultraforming (Petroleum Engineer, vol. XXVI, No. 4, April 1954, at page C–35), and Powerforming (The Oil and Gas Journal, vol. 54, No. 46, March 19, 1956, at page 150).

Such systems includes lead, intermediate and tail reactors, heating zones, a gas separation zone, and compressor and lines for recycling hydrogen-rich separated gas. When catalyst in a particular reactor becomes substantially deactivated, that reactor is isolated and the catalyst regenerated while reforming continues in the remaining reactors. In such systems hydrogen-rich recycle gas and naphtha are already at reforming temperature when coming into contact with the regenerated catalyst. Two distinct heat-fronts may result. The first heat-front may begin when the hydrogen-rich recycle gas, which at high reforming severity contains substantial hydrocarbons, initially contacts the catalyst. The second heat-front appears when the naphtha is subsequently introduced into the reactor. The resulting heat-fronts cause coke formation on the catalyst with consequent catalyst deactivation. In extreme cases, heat-fronts may also cause deactivation by changing the crystalline structure of the catalyst, e.g., from active gamma, chi, or eta alumina to inactive alpha alumina, particularly in the case of platinum-alumina catalysts containing halogen.

An object of this invention is to avoid the formation of damaging heat-fronts when hydrogen and hydrocarbons come in contact with new or regenerated platinum catalyst at reforming temperatures. Another object is to avoid deactivation of new or fully-reactivated platinum catalysts in a reactor which is being returned to reforming operation in a multiple fixed-bed reactor system wherein naphtha is being simultaneously reformed at high severities in other reactors. Still another object of this invention is to permit the return to one-stream operation of a reactor containing regenerated-rejuvenated platinum catalyst without having to cool the catalyst bed or lower the temperature of the hydrogen-rich recycle gas and naphtha introduced therein below conventional reforming temperatures. A still further object is minimize damaging heat-fronts in platinum-alumina catalysts without substantial equipment additions or increase in operating costs.

These and other objects will be apparent as the detailed description of the invention proceeds.

To avoid damaging heat-fronts when bringing a reactor containing a highly-active platinum-catalyst on-stream at reforming temperature I first purge said reactor with inert gas, e.g., flue gas, nitrogen, and the like, to remove any oxygen therefrom, particularly after an oxidative regeneration cycle. The reactor is then purged with substantially-pure hydrogen at reduced pressure, e.g., atmospheric pressure, to remove substantially all traces of the inert gas, following which the reactor is pressured up with said substantially-pure hydrogen to a pressure intermediate said reduced pressure and the elevated pressure at which the subsequent hydroforming reaction is to take place. Finally, the reactor is further pressured up to hydroforming pressure with hydrogen-rich recycle gas, following which naphtha vapors are introduced, preferably as rapidly as possible. By following such procedure the damaging effects of both the recycle gas hot-spot and naphtha hot-spot are eliminated or minimized.

By "substantially-pure hydrogen" is meant a gas which contains above about 90 mol per cent hydrogen, e.g., 91 percent or more, and at least about 95 mol percent hydrogen plus methane, and preferably higher, although the presence of sulfur, e.g., less than about 5 mol percent, in said hydrogen has not been found to be deleterious. In some instances, the presence of such sulfur has actually been found to be advantageous in further suppressing hot spots. Optimally, the substantially-pure hydrogen should contain 95 mol percent or higher of hydrogen.

At high reforming severities, i.e., reformate product of at least about 90 CFR–R unleaded octane number, hydrogen content of so-called hydrogen-rich separated gas or recycle gas, which is usually obtained by flashing gases from reformate product in a high pressure separator, is about 65–85 percent. In general, the higher the reforming severity, the lower the hydrogen content. It is the presence of excessive hydrocarbons boiling above methane, i.e., more than 5 mol percent, in the hydrogen-rich separated gas that is associated with the recycle-gas hot-spot problem. Higher severities also normally require higher catalyst and gas temperatures, thereby aggravating the problem. While methane does not aggravate the hot spot problem, high hydrogen concentrations are required to obtain immediate coke suppression when naphtha vapors are introduced. By first purging and pressuring up part way with substantially-pure hydrogen, however, no hot-spots are formed, by completing the pressuring-up with a minor amount of hydrogen-rich separated gas no compression means are required over and above that which is already present for recycling hydrogen-rich separated gas.

An attractive feature of the present invention is the fact that substantially-pure hydrogen is already present, in most hydroforming systems, and thus no new equipment is required. At high reforming severities hydrogen-rich separated gas, as pointed out above, normally contains substantial amounts of hydrocarbons boiling above methane. Such gases are frequently called wet gases, and substantial amounts are often rejected to fuel. To minimize loss of higher-boiling hydrocarbons, wet gases are usually scrubbed. A typical method is to contact the wet gas in an absorber with a heavier hydrocarbon stream which may be charge stock, or preferably, heavy ends from charge stock. After the scrubbing operation, hydrogen content of absorber gas is usually substantially above about 90 percent and hydrogen-plus-methane content is usually at least about 95 percent.

For very high severity reforming operations, i.e., reforming to unleaded reformate octane numbers in excess of 95 CFR–R, and for feed stocks of low naphthene content, i.e., less than about 40 percent by volume, hydrogen content of absorber gas may still not be above about 90 percent. In such cases the gas, or at least that portion of the gas which is needed for the purging and pressuring-up operations of the present invention, should be subjected to additional scrubbing, as hereinafter described in the detailed description and drawing, said additional scrubbing not involving any additional operating costs.

My invention is very advantageously employed in connection with regenerative platinum-alumina hydroforming systems which usually operate at high severity and in which one or more of the reactors may be isolated from the remainder of the on-stream reactors for catalyst reactivation. In such systems a portion of hydrogen-rich separated gas from the product gas separation zone is recycled by compression means and lines to on-stream reactors. At the same time, another portion of the hydrogen-rich separated gas is charged to an absorption zone wherein hydrocarbons are removed so as to form substantially-pure hydrogen. The absorption zone normally operates at a pressure substantially below the inlet pressure of the on-stream reactors. Thus, substantially-pure hydrogen from the absorption zone cannot be used to pressure-up a reactor to the required reforming pressure without additional and expensive compression means. The practice of my invention, however, avoids the expense of such additional compression means and at the same time eliminates the hot-spot problem. The small amount of hydrogen-rich separated gas required to complete pressuring up does not cause damaging hot spots.

The reactor being placed on-stream should be at about on-stream pressure before introducing naphtha so that the naphtha may be brought in as rapidly as possible. If naphtha were introduced immediately after pressuring-up with substantially-pure hydrogen, the large pressure differential, e.g., 50–150 pounds per square inch, would necessitate slow and careful metering in of the naphtha vapors. Such slow introduction of naphtha would result in substantial naphtha heat-fronts.

Without my special procedure as above described, heat-fronts may be formed and, when formed, usually pass through the catalyst bed at the rate of between 0.05 and 0.5 inch per second in the direction of recycle gas and naphtha flow. They may raise catalyst temperature to levels in excess of 1200–1300° F. The particular extent of coke formation resulting from heat-fronts depends on many variables, including the severity of the hot-spot, recycle gas rate, initial activity of the catalyst, and the like. For instance, in one series of tests with a platinum-alumina catalyst containing 0.6 weight percent platinum and a Mid-Continent naphtha at a recycle gas rate of 4000 cubic feet per barrel, naphtha heat-fronts deposited coke on the catalyst to the extent of 0.02 weight percent coke for each 10° F. of temperature rise.

It has been observed that heat-fronts are usually encountered only for a short period after recycle gas and/or naphtha are introduced at reforming conditions. They are also usually encountered only with new platinum catalyst or used platinum catalyst which are in a highly-active state. Thus with a slightly deactivated catalyst, the heat-front may be encountered after a simple carbon burnoff. With a substantially deactivated platinum catalyst the heat-front may be encountered only after substantial reactivation by such a technique as the regeneration-rejuvenation technique used in Ultraforming. Heat-front formation may be particularly pronounced if the platinum catalyst has been contacted with a halogen or halogen-affording compound. In the normal start-up of platinum catalyst reformers heat-fronts are usually not considered a problem because the platinum catalyst is normally contacted with hydrogen and hydrocarbons at a temperature substantially below reforming temperature, e.g. below about 800° F.

The invention will be more clearly understood by reference to the following example read in conjunction with the accompanying drawing which is a schematic flow diagram of an Ultraforming system in which my procedure for bringing a reactor on-stream is advantageously employed.

Typical reforming conditions are a temperature in the range of about 800 to 1050° F., pressure in the range of about 100–1000 pounds per square inch gage, hourly weight space velocity in the range of about 0.1 to 10, and hydrogen-rich recycle gas rate in the range of about 1,000 to 10,000 standard cubic feet per barrel of naphtha charge. In the Ultraforming process advantage is taken of the many benefits of operating at lower reforming pressure, i.e., pressures in the range of about 100–400 pounds per square inch gage. Temperatures are usually in the range of about 850–1000° F., space velocities in the range of about 0.5 to 5, and hydrogen-rich recycle gas rates in the range of about 2000 to 8000 standard cubic feet per barrel of naphtha charge.

Ultraforming uses an alumina-supported platinum catalyst, in which the platinum content is in the range of about 0.05 to 1 percent by weight. The catalyst is loaded in a series of fixed-bed reactors, usually 3 to 6 in number. A spare or "swing" reactor is usually provided along with suitable manifolding lines and valves so that when catalyst in any of the on-stream reactors becomes deactivated, the swing reactor may be temporarily substituted for it. The deactivated catalyst is then regenerated by special techniques involving the use of oxygen-containing gases which fully restore catalyst activity. As shown in the attached figure catalyst in swing reactor 1 is being regenerated, while naphtha is being processed in on-stream reactors 2, 3, and 4.

A full-boiling range naphtha, e.g., a 180–400° F. ASTM boiling-range Mid-Continent naphtha, which may have previously been subjected to hydrogenation step, is introduced from source 10 and charged via line 11 to prefractionator 12 along with a rich oil from line 13 which will be described in further detail below. Light ends are removed overhead via line 14 and heavy ends are removed as bottoms via line 15. Part of these heavy ends are sent via line 16 for further use as a lean oil as will hereinafter be described. A heart cut from fractionator 12, e.g., a 200–360° F. ASTM cut, is charged via line 17 to furnace 18 after being combined with hydrogen-rich recycle gas from line 17a. Optionally, the heart cut and recycle gas may be heated in separate coils in furnace 18 and then combined.

After being heated to reaction temperature, e.g., 940° F., in furnace 18 the naphtha and recycle gas are charged via lines 19, 20 and 21 to reactor 2. Reactions in reactor 2 are predominantly endothermic and effluent from reactor 2 must be sent via line 22 to furnace 23 for reheating. In like manner, reheated naphtha is charged via lines 24, 25, and 26 to reactor 3 and thence via line 27, furnace 28, and lines 29, 30 and 31 to reactor 4. Product effluent from reactor 4 is charged via lines 32, and 33 to separator 34. Reformate product is drawn via line 35 and hydrogen-rich separated gas is withdrawn via line 36.

Such separated gas at reformate octane numbers above about 90 CFR–R unleaded usually contain substantially less than about 90 percent hydrogen. A portion of this gas is charged via line 37 to compression means 38, e.g. a centrifugal compressor, wherein pressure is raised above that of reactor 2 and the separated gas recirculated via lines 39 and 17a back to line 17. Another portion of the gas from line 39 is periodically diverted via line 40 to regeneration manifold 41 for the final pressuring-up step of my invention as will be further described hereinafter.

Another portion of the hydrogen-rich separated gas from line 36 is charged as a wet gas via line 42 to a point near the lower part of absorber 43. Lean oil, which in this specific embodiment is a portion of heavy ends from prefractionator 12, is charged via line 16 to a point near the upper part of the narrow section of absorber 43. The lower section of absorber 43 is the primary absorption section wherein all the wet gas is contacted with lean oil which flows downwardly through absorber 43 and is returned via line 13 as a rich oil to prefractionator 12 for separation of light hydrocarbons. A portion of the upward-flowing gases in absorber 43 is withdrawn as a dry gas via line 44. Since at least a substantial portion (e.g., about half or more) of the hydrocarbons present in the wet gas have been removed, the hydrogen concentration of the dry gas is substantially higher than that of the hydrogen-rich separated gas.

Another portion of the upward-flowing gases in absorber 43 is further contacted with incoming lean oil in the upper narrow section of absorber 43, which constitutes a secondary absorption zone. Here at least a substantial portion of the remaining hydrocarbons are also removed. The gas leaving the secondary absorption zone via line 45 is the substantially-pure hydrogen, which is used in the practice of my invention as hereinafter described. When this substantially-pure hydrogen is not required in the practice of this invention, i.e., when no reactors are being returned to on-stream operation, it may be vented via line 46 to fuel or to other processes wherein high-hydrogen-content gases may be advantageously used. It should be understood that although in this example substantially-pure hydrogen is obtained from the secondary absorption zone, dry gas from the primary absorption may also prove satisfactory, particularly at reforming intensities in the range of 90–95 octane number and with high-naphthene-content feeds. In all cases, however, the hydrogen content must be above about 90 mol percent and the hydrogen plus methane above about 95 mol percent.

It can be seen from a study of the valving and manifolding arrangement that swing reactor 1 may be substituted for, or placed in parallel with, each of reactors 2, 3, or 4. This is made possible with a minimum of lines by means of on-stream manifolds 47 and 48. Likewise, each of the reactors may individually be taken off-stream and regenerated without interrupting the flow of naphtha through the remaining on-stream reactors. This is made possible with a minimum of lines by means of regeneration manifolds 41 and 49.

Swing reactor 1 is shown as being regenerated by means of air and/or flue gas introduced from sources 50 and 51 respectively. Regeneration gases pass via line 52, furnace 53, line 54, manifold 49, and line 55 to swing reactor 1. Regeneration gases leave swing reactor 1 via line 56 and travel to regeneration manifold 41 and line 57, and thence are vented via line 57a and/or are recirculated via line 58. It should be understood that the direction of gas flows as herein described is illustrative only and should not be considered limiting in any sense.

After regeneration, and in accordance with my invention, introduction of air from source 50 is stopped, and oxygen-containing gases are removed from swing reactor 1 by introducing additional amounts of flue gas from source 51, which after passing through swing reactor 1 are vented via line 57a. Regeneration facilities are then isolated from swing reactor 1 by closing valves in lines 57 and 54. Swing reactor 1 is then purged at about atmospheric pressure with substantially-pure hydrogen which is introduced from line 45 via line 59, manifold 41, and line 56, the gas leaving swing reactor 1 via line 55, manifold 49, and vent line 60. After complete purging of flue gas and/or drying of the catalyst in swing reactor 1 by means of substantially-pure hydrogen, valve in line 55 is closed and swing reactor 1 is pressured up with said substantially-pure hydrogen to the pressure at which such substantially-pure hydrogen is available from absorber 43 via line 45. Typically, for an Ultraforming system with an inlet pressure to the first reactor of about 300 pounds per square inch gage, the pressure of substantially-pure hydrogen from absorber 43 is in the range of about 175 to 225 pounds per square inch gage, i.e., about 75 to 125 pounds per square inch below on-stream pressure. Pressure in swing reactor 1 is then raised to on-stream pressure by means of hydrogen-rich separated gas, which is introduced from line 40 via manifold 41 and line 56. With swing reactor 1 at about on-stream pressure the swing reactor may be paralleled with or substituted for any of the other reactors by means of the proper manifolds and valves.

Since substantially-pure hydrogen is used to urge and initially pressure-up swing reactor 1, no damaging hot-spots occur in the catalyst bed. Double use of the absorption medium, i.e., heavy ends (lean oil) from prefractionator 12, provides both dry gas and substantially-pure hydrogen without additional processing costs. By completing the pressuring-up with hydrogen-rich recycle gas, no additional compression means are required to bring swing reactor 1 to on-stream pressure. With swing reactor 1 at on-stream pressure naphtha may be introduced very rapidly by opening valves wide open, and thus any resulting heat-fronts or hot-spots can be quenched, i.e., the heat carried away, by the large volume of incoming naphtha vapors before any damage to the catalyst occurs.

While my invention has been described hereinabove as applied to bringing the swing reactor of an Ultraforming unit on-stream at reforming temperature, it should be understood that it is equally applicable to each of the other reactors when bringing said reactors on-stream at reforming temperature. While my invention has also been described as applied to a particular Ultraforming system, various alternative systems, arrangements, and operating conditions will be apparent from the above description to those skilled in the art.

Having thus described my invention, I claim:

1. In a naphtha hydroforming system wherein hydrocarbon naphthas are contacted at high severities including elevated temperature and pressure in the presence of a supported-platinum catalyst, said system including a plurality of reactors, a gas separation zone, and compressor means and lines for recycling hydrogen-rich separated gas to said plurality of reactors, said separated gas containing about 65 to 85 mol percent hydrogen, the method of bringing a reactor on-stream at elevated temperature without forming damaging hot-spots which comprises purging said reactor with inert gas to remove oxygen therefrom, purging said reactor at reduced pressure with substantially-pure hydrogen containing above about 90 mol percent hydrogen and at least about 95 mol percent hydrogen plus methane, pressuring-up to a pressure intermediate said reduced pressure and said elevated pressure with said substantially-pure hydrogen, pressuring-up to said elevated pressure with said hydrogen-rich separated gas, and introducing naphtha vapors therein.

2. The method of claim 1 wherein said substantially-pure hydrogen is obtained by removing at least a substantial portion of the hydrocarbons present in said hydrogen-rich separated gas.

3. The method of claim 1 wherein said inert gas is flue gas and said reduced pressure is about atmospheric pressure.

4. In a regenerative platinum-alumina catalyst reforming system containing a plurality of reactors in which platinum catalyst in any of said reactors is reactivated off-stream in the presence of oxygen-containing gases while naphtha is being reformed at high severity in the remaining of said reactors at reforming temperature and pressure in the presence of recycled hydrogen-rich gas containing about 65 to 85 mol percent hydrogen, the method of returning an off-stream reactor after regeneration to reforming operation without reducing temperature thereof substantially below reforming temperature, which method comprises purging said off-stream reactor with flue gas to remove oxygen therefrom, displacing said flue gas at reduced pressure with substantially-pure hydrogen containing above about 90 mol percent hydrogen and at least about 95 mol percent hydrogen plus methane, pressuring-up with said substantially-pure hydrogen to a pressure intermediate, said reduced-pressure and said reforming pressure, further pressuring-up to said reforming pressure with said hydrogen-rich gas, and introducing naphtha vapors therein.

5. The method of claim 4, wherein said hydrogen-rich gas is subjected to an absorption step so as to remove at least a substantial portion of hydrocarbons therein and to produce thereby said substantially-pure hydrogen.

6. In a naphtha reforming system wherein naphtha is converted at reforming temperature and pressure in the presence of a supported-platinum catalyst to CFR-R unleaded octane numbers in excess of 90, said system including a plurality of reactors, any of which reactors may be isolated from the remainder of the on-stream reactors for catalyst reactivation, a gas separation zone for separating hydrogen-rich separated gas containing about 65 to 85 mol percent hydrogen, compressor means and lines for recycling a portion of said hydrogen-rich separated gas to said on-stream reactors, an absorption zone wherein hydrocarbons are removed from another portion of said hydrogen-rich separated gas to obtain thereby substantially-pure hydrogen containing above about 90 mol percent hydrogen and at least about 95 mol percent hydrogen plus methane, the method of bringing a reactor on-stream at reforming temperature after regeneration thereof which comprises purging said reactor with flue gas to remove oxygen therefrom, purging said reactor with said substantially-pure hydrogen at reduced pressure, pressuring-up said reactor to about the pressure of said absorption zone with said substantially-pure hydrogen, pressuring-up to said reforming pressure with said hydrogen-rich separated gas and thereafter introducing naphtha vapors therein.

7. The method of claim 6 wherein said supported-platinum catalyst is a halide-containing alumina-supported platinum catalyst.

8. A naphtha reforming process which comprises contacting a hydrocarbon naphtha with a halide-containing platinum-alumina catalyst at high-severity reforming conditions, including elevated temperature and elevated pressure, in a plurality of reactors; separating hydrogen-rich separated gas containing about 65 to 85 mol percent hydrogen from the resulting contacted naphtha; recycling a portion of said hydrogen-rich separated gas; absorbing hydrocarbons from another portion of said hydrogen-rich separated gas in an absorption zone so as to produce substantially-pure hydrogen containing above about 90 mol percent hydrogen and at least about 95 mol percent hydrogen plus methane, said absorption zone operating at a pressure below said elevated pressure; periodically isolating at least one of said reactors from reforming conditions and reactivating the catalyst therein by contact with oxygen-containing gases; purging the isolated reactor after reactivation with flue gas to remove oxygen therefrom; purging and pressuring-up said isolated reactor, without substantially reducing the temperature thereof, to about the pressure of said absorption zone with said substantially-pure hydrogen; further pressuring-up said isolated reactor with said hydrogen-rich separated gas to said elevated pressure; returning said isolated reactor to reforming conditions by introducing naphtha vapors therein.

9. The process of claim 8 wherein said contacted naphtha has a CFR-R unleaded octane number in excess of about 95 and in said absorption zone hydrogen-rich separated gas is contacted in a primary absorption section with an absorption medium, following which part of the contacted gas is withdrawn as a dry gas and the remainder of said contacted gas is further contacted in a secondary absorption section with said absorption medium prior to the entry of said absorption medium into said primary absorption section, whereby the gas after such further contact is said substantially-pure hydrogen.

References Cited in the file of this patent

UNITED STATES PATENTS

| | | |
|---|---|---|
| 2,773,013 | Wolf et al. | Dec. 4, 1956 |
| 2,773,014 | Snuggs et al. | Dec. 4, 1956 |